United States Patent [19]

Yokev et al.

[11] Patent Number: 5,592,180
[45] Date of Patent: Jan. 7, 1997

[54] DIRECTION FINDING AND MOBILE LOCATION SYSTEM FOR TRUNKED MOBILE RADIO SYSTEMS

[75] Inventors: Hanoch Yokev, Ramat-Gan; Haim Harel, Herzelia; Yehouda Meiman, Rishon Letzian; Shimon Peleg, Hod Hasharon, all of Israel

[73] Assignee: Nexus1994 Limited, London, Great Britain

[21] Appl. No.: 329,549

[22] Filed: Oct. 26, 1994

Related U.S. Application Data

[63] Continuation-in-part of Ser. No. 158,441, Nov. 24, 1993, Pat. No. 5,430,759, which is a continuation-in-part of Ser. No. 961,776, Oct. 15, 1992, Pat. No. 5,335,246, which is a continuation-in-part of Ser. No. 932,610, Aug. 20, 1992.

[51] Int. Cl.⁶ .................................................... G01S 3/02
[52] U.S. Cl. .......................... 342/450; 342/457; 342/446
[58] Field of Search .................................. 342/450, 457, 342/446, 460

[56] References Cited

U.S. PATENT DOCUMENTS

| | | | |
|---|---|---|---|
| 2,437,695 | 3/1948 | Jansky . | |
| 3,445,847 | 5/1969 | Hammack . | |
| 3,747,104 | 7/1973 | Pansini . | |
| 3,864,681 | 2/1975 | Olive | 343/112 R |
| 3,886,554 | 5/1975 | Braun et al. | 343/112 |
| 3,972,042 | 7/1976 | Johnson | 343/17.2 |
| 4,114,155 | 9/1978 | Raab | 343/105 |
| 4,188,629 | 2/1980 | Johnson | 343/6.5 |
| 4,217,586 | 8/1980 | McGuffin | 343/100 |
| 4,229,620 | 10/1980 | Schaible | 179/2 |
| 4,369,426 | 1/1983 | Merkel | 340/32 |
| 4,449,127 | 5/1984 | Sanchez | 343/7 |
| 4,494,119 | 1/1985 | Wimbush | 343/457 |
| 4,596,988 | 6/1986 | Wanka | 343/457 |
| 4,665,379 | 5/1987 | Howell et al. | 340/63 |
| 4,665,404 | 5/1987 | Christy et al. | 342/463 |
| 4,698,781 | 10/1987 | Cockerell, Jr. | 364/561 |
| 4,728,959 | 3/1988 | Maloney et al. | 342/457 |
| 4,740,792 | 4/1988 | Sagey et al. | 342/457 |
| 4,742,357 | 5/1988 | Rackley | 342/457 |

(List continued on next page.)

FOREIGN PATENT DOCUMENTS

| | | |
|---|---|---|
| 2667949 | 4/1992 | France . |
| 58/28675 | 2/1983 | Japan . |
| WO88/01750 | 3/1988 | WIPO . |
| WO89/12835 | 12/1989 | WIPO . |

OTHER PUBLICATIONS

Ernest Jacobs, et al., "Ambiguity Resolution in Interferometry", *IEEE Transactions on Aerospace and Electronic Systems*, 17, No. 6, pp. 776/780, dated Nov. 1981.

Mati Wax et al., "Decentralized Processing in Sensory Arrays", *IEEE Transactions on Acoustics, Speech, and Signal Processing*, ASSP–33, No. 4, pp. 1123–1129, dated Oct. 1985.

*Primary Examiner*—Thomas H. Tarcza
*Assistant Examiner*—Dao L. Pham
*Attorney, Agent, or Firm*—Schwegman, Lundberg, Woessner & Kluth, P.A.

[57] ABSTRACT

A special mobile radio mobile, vehicle or personal location system is described where the system operates to locate any one of a the transmitters in an SMR system. The present invention operates by identifying the received signals, removing the modulation information to reconstruct a demodulated carrier and analyzing the carrier signals for multipath distortion. The multipath disruptions are removed to calculate the true incident angle of the transmitted signal at a base station. A plurality of base stations are used to simultaneously calculate the incident angle of the transmitted SMR signal and a central location calculates the most probable location of the transmitter based upon triangulation. The incident angle of the transmitted SMR signal at each base station is performed by calculating the phase differences of the incoming voice signal with phase ambiguity minimized by using a plurality of dipole antennas spaced at an irregular distance to eliminate phase ambiguity error.

7 Claims, 6 Drawing Sheets

U.S. PATENT DOCUMENTS

| | | | |
|---|---|---|---|
| 4,791,572 | 12/1988 | Green, III et al. | 364/449 |
| 4,799,062 | 1/1989 | Sanderford et al. | 342/450 |
| 4,891,650 | 1/1990 | Sheffer | 342/457 |
| 4,905,271 | 2/1990 | Namekawa | 379/58 |
| 4,916,455 | 4/1990 | Bent et al. | 342/457 |
| 5,003,317 | 3/1991 | Gray et al. | 342/457 |
| 5,021,794 | 6/1991 | Lawrence | 342/457 |
| 5,055,851 | 10/1991 | Sheffer | 342/457 |
| 5,081,667 | 1/1992 | Drori et al. | 379/59 |
| 5,099,245 | 3/1992 | Sagey | 342/357 |
| 5,208,756 | 5/1993 | Song | 364/449 |
| 5,218,367 | 6/1993 | Sheffer et al. | 342/457 |
| 5,311,197 | 5/1994 | Sorden et al. | 342/457 |
| 5,317,323 | 5/1994 | Kennedy et al. | 342/457 |
| 5,327,144 | 7/1994 | Stilp et al. | 342/387 |
| 5,365,451 | 11/1994 | Wang et al. | 364/449 |
| 5,365,516 | 11/1994 | Jandrell | 370/18 |
| 5,379,047 | 1/1995 | Yokev et al. | 342/457 |
| 5,396,540 | 3/1995 | Gooch | 379/59 |

DISPATCHER TO MOBILE ←→
MOBILE TO MOBILE ←--→

DIRECTION FINDING AND MOBILE LOCATION SYSTEM FOR TRUNKED MOBILE RADIO SYSTEMS

The present patent application is a continuation-in-part of Ser. No. 158,441, filed Nov. 24, 1993, U.S. Pat. No. 5,430,759, entitled "LOW-POWER FREQUENCY-HOPPED SPREAD SPECTRUM ACKNOWLEDGMENT PAGING SYSTEM" issued Jul. 4, 1995, which in turn is a continuation-in-part of Ser. No. 961,776, filed Oct. 15, 1992, U.S. Pat. No. 5,335,246 entitled "PAGER WITH REVERSE PAGING FACILITY" issued Aug. 2, 1994, which in turn is a continuation-in-part of U.S. patent application Ser. No. 07/932,610 entitled "REMOTE POSITION DETERMINATION" filed Aug. 20, 1992, all of which, including the microfiche appendices, are hereby incorporated by reference.

FIELD OF THE INVENTION

The present patent application relates to radio transmitter location in a communication system and in particular to locating a transmitter in a special mobile radio system.

BACKGROUND OF THE INVENTION

Mobile trunking radio is well known in the art and is also sometimes known as Special Mobile Radio (SMR) systems. A trunked radio system is a system setup to serve a plurality of users in a licensed radio frequency band to provide radio or radio-telephone services to base or mobile units within a defined geographic market area. Typically SMR systems are used in the public safety industry for such services as police, fire, and medical providers and also in the industrial or land transportation industries, such as, taxicab services, bus services and the like. Such an SMR system typically also includes repeater stations in which the signals from individual users are amplified and repeated at various places within the geographic market to provide a wider geographic accessibility.

In the United States, an SMR service provider typically obtains a license for a band of frequencies within the 800 and 900 MHz frequency range from Federal Communication System (FCC). The SMR system is described as a trunked system which means that several channels are allocated within a given frequency band and the transmitters and receivers use automatic switching so that all users can access any one of the allocated channels which are not currently in use. This form of frequency sharing results in a minimum wait or blockage of a message through the system by an individual user since the user's transmitter shares all available channels.

By way of example, the FCC has allocated 250 channels located in the frequency band of 809 to 816 MHz. Each channel spacing is 25 KHz and the maximum deviation of a transmit frequency is plus or minus 5 KHz. The required frequency stability is 2.5 ppm for transmitters. The FCC allocation also provides for repeater channels which are located 45 MHz above these frequencies. For purposes of the present discussion, repeater frequencies are not required and hence will not be discussed.

Typically the mobile transceivers in an SMR system can be linked to a public switched telephone network by base station or to cellular telephone systems. Access to the public switched network may be from a variety of means including DTMF tone signalling for automatic operation without human intervention. All the SMR channels are voice channels for carrying analog voice signals to in-band tone signalling may be used to interface to a land-based public switched telephone network. Links to cellular telephone systems has been done in systems described as Extended Special Mobile Radio (ESMR) systems.

Special mobile radio systems to which the present invention applies allow the automatic sharing of a plurality of channels by all users of the system in a blocking communication model. The system is blocking since there are typically more users than there are channels and the channels are allocated based on demand. Statistically the number of channels allocated to a user group is based upon a peak demand usage to minimize blockage of the channels due to unavailability of an open channel. Of course the greater number of channels in a special mobile radio system, the fewer times the channels are blocked.

Another feature of the special mobile radio system is the use of a control channel to allow coherent channel allocation to maximize usage of the system. The control channel may be a dedicated frequency, a subcarrier frequency or a sub-audible frequency in selected voice channels in the SMR system. Allocation and usage of the communication channels is therefore negotiated through the control channel in a distributive processing topology in which a central control site and the various user sites negotiate the use of the channels during handshake transmissions prior to channel usage. Various types of communications protocol may be employed to ensure non-interference among the various users of the system. The control channel typically carries control information in a digital format.

Prior art FIG. 1 shows a typical simplified SMR radio system used to communicated with a plurality of cars 101a, 101b, 101c, etc. from a control station 103 via communications antenna 102. In this system, all the mobile radio transceivers 101a, 101b, 101c share a number of common frequency channels in which an individual transceiver may use any one of the unused channels at any given time to communicate with the control station.

There is a need in the art, however, to locate the mobile transceivers in a special mobile radio system. There is a need to identify and locate the mobile transmitters in an SMR system while the mobile transmitters are transmitting. There is also a need in the art to track the movement of the transmitters even if the transmitters change frequency channels over a period of time.

Location of radio transmitters is a technology that has been used for many years and in many applications. For radio location, the use of mobile transmitters and a plurality of fixed base station receivers is generally known in the art where the fixed receivers locate the source of the radio signal by triangulation of the radio signals. Triangulation is a technique where the fixed base station receivers each determine the approximate direction of the radio signal from the transmitter. The approximate direction lines are then drawn on a map where the lines will cross. Since the direction lines are approximate, and typically three fixed base station receivers are used, the intersecting area between the three lines is usually shaped like a triangle since the lines rarely meet at a single point. The transmitter is then located within the triangle.

There is a need in the art for a ground-based vehicle or mobile transmitter location system which is capable of locating SMR transmitters. There is a further need for a ground-based mobile transmitter location system which is immune from disruption of the radio signals in an urban or irregular terrain environment. For these reasons, and for other reasons stated below which will become apparent to those skilled in the art upon reading and understanding the present specification, there is a need in the art for a special mobile radio vehicle or personal locator system.

SUMMARY OF THE INVENTION

The present invention solves the above-mentioned problems with locating transmitters in special mobile radio systems and other problems which will be understood by those skilled in the art upon reading and understanding the present specification. The present invention describes a mobile, personal or vehicle location system which locates any one of a large number of transmitters in an SMR system. The present invention operates by first identifying the transmitter during the SMR transmissions. If the location of the transmitter requires periodic recalculation, the present invention tracks any channel frequency changes based on that particular transmitter's use of the frequency channels. The received signals are analyzed to calculate the incident angle of the transmitted signal at a base station. A plurality of base stations are used to simultaneously calculate the incident angle of the transmitted SMR signal and a central station calculates the most probable location of the transmitter based upon triangulation.

To perform the triangulation at the central station, the incident angle of the transmitted SMR signal is calculated at each base station. The received SMR signal is detected, the transmitter identity is determined and the modulation information is removed. Once the base carrier signal is recovered, the phase of the received carrier is compared between a plurality of antennas in an irregular spaced array of antennas. The phase differences of the incoming carrier signal are compared between the antennas and the phase ambiguity is minimized to accurately determine the incident angle of the received carrier.

BRIEF DESCRIPTION OF THE DRAWINGS

In the drawings, where like numerals refer to like components throughout the several views.

DETAILED DESCRIPTION OF THE PREFERRED EMBODIMENT

The specification for the present invention described herein includes the present description, the drawings, and claims. The present specification also includes the descriptions, drawings, claims as filed of U.S. patent application Ser. No. 08/000,000 entitled "MULTIPATH-RESISTANT FREQUENCY-HOPPED SPREAD SPECTRUM MOBILE LOCATION SYSTEM" filed Oct. 26, 1994, on even date with the filing of the present patent application, and which is hereby incorporated by reference.

In the following detailed description of the preferred embodiment, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

Figure 1:
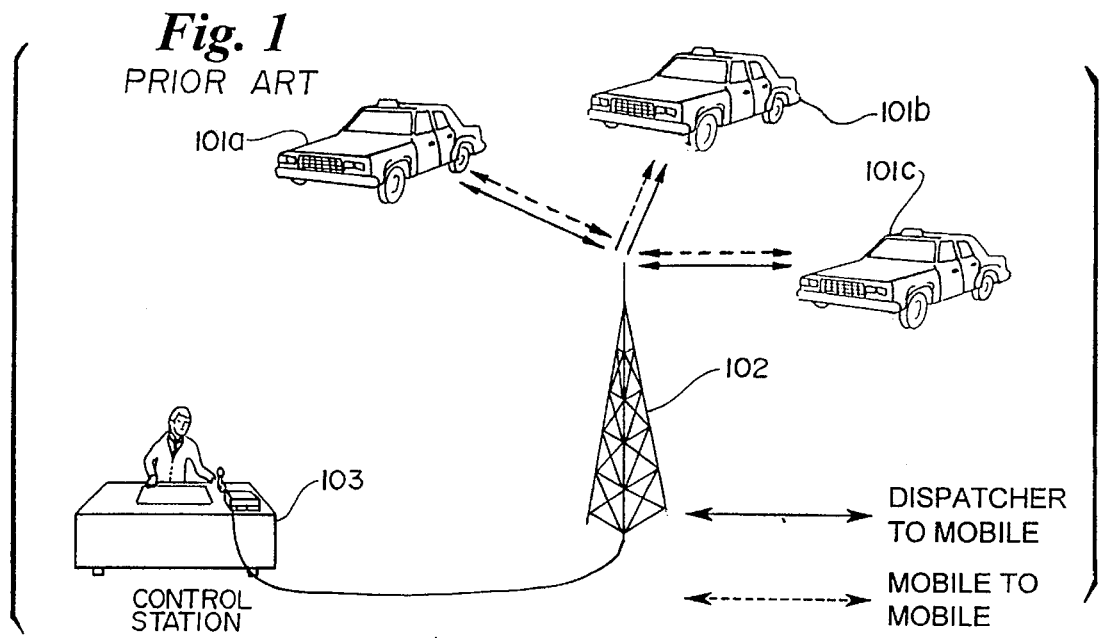
FIG. 1 is a prior art description of a typical Special Mobile Radio (SMR) system.
Figure 2:
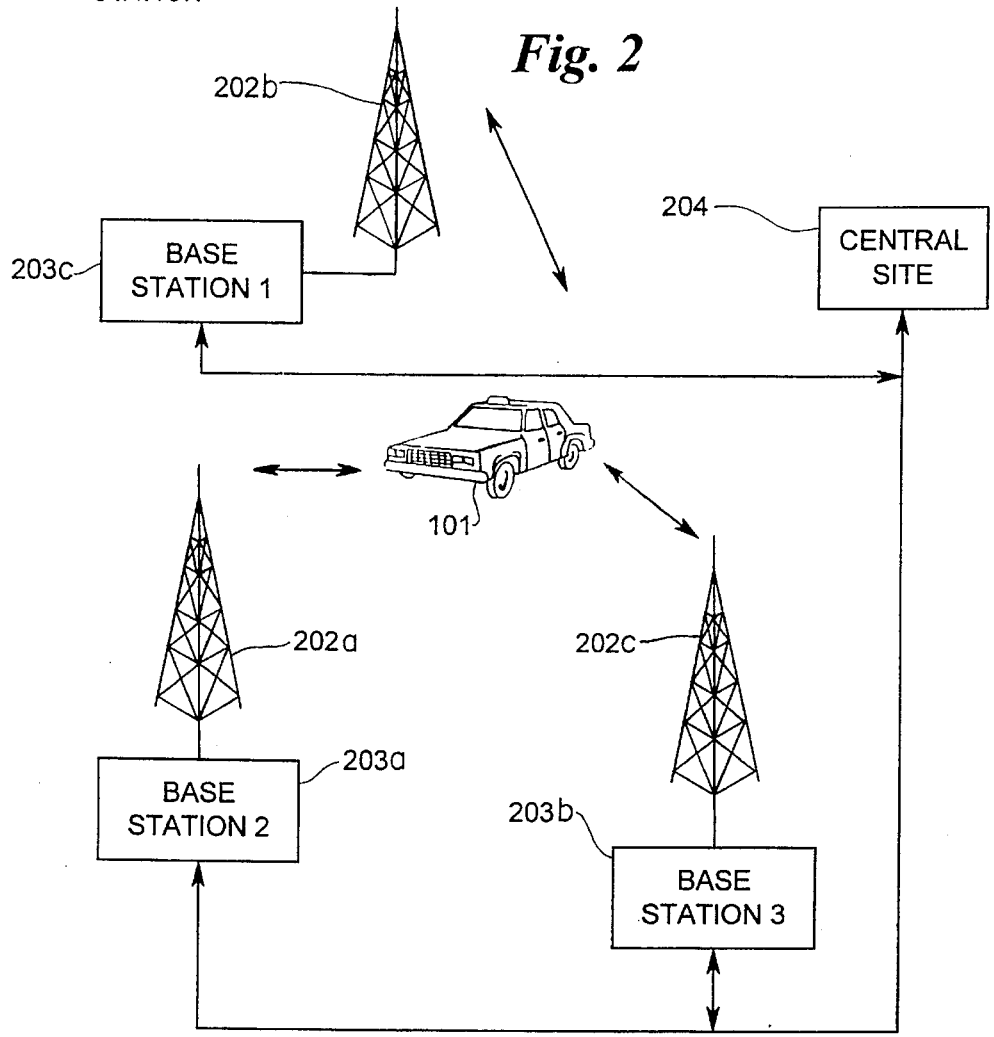
FIG. 2 is a block diagram of the present invention adapted to locate SMR transmitters by triangulation.

The present invention shown diagrammatically in FIG. 2 operates to locate the mobile transceivers in a special mobile radio system. The transceivers may be located in a car 101, in a building (not shown), carried by a person (not shown), carried within containers or packages, or any number or variety of mobile carriers. In a single transmission, the SMR transmitters are transmitting on a single frequency channel within the SMR channel space. Over an extended period of time, the transmitter may be transmit a plurality of discrete messages using a variety of channel frequencies which may be different for each messages. The location algorithms monitor the control channel and, if necessary, track the channel frequency changes in the SMR system if a continuous tracking of the transmitter is required.

The preferred embodiment of the present invention is designed as a separate but parallel operating system used to locate SMR transmitters without any modification of an existing SMR system. The present invention is designed, in effect, to be an "add-on" system to add the capabilities of SMR transmitter location without any modifications to the existing SMR system whatsoever. Those skilled in the art will readily appreciate, however, that the present invention may be made a partial or integral part of an SMR system to save on duplication of hardware and installation costs.

Typically, the location of the transmitter is determined once but for a moving vehicle, periodically updated location information may be required. Usually, the SMR transmitters are activated only by the operator. In a system which is designed to include the present invention as an integral part of the overall SMR system, however, the SMR transmitters may be polled by a base station or central station to transmit without operator intervention so the SMR transmitter location may be determined. This would be a "fleet location poll". Also, the present invention may be used as a "panic button" or "assistance request" system in which SMR transmitters are used summon help on operator demand, or automatically summon help such as in the case of a crash-activated deceleration switch similar to the deceleration switches used to activate vehicle airbag systems.

As shown in FIGS. 2, a plurality of base station antennas 202a, 202b and 202c receive the SMR radio transmissions and the base station equipment 203a, 203b and 203c, respectively, each locate the incident angle of arrival of the true signal even in the face of selective fading and multipath receptions. Several of the most probable incident angles of the received signals are sent from the base stations 203a, 203b and 203c to a central site 204 for triangulation. See also FIG. 8.

The location system comprises a plurality of base stations (at least two) which transmit signals to the SMR remote mobile units and receive signals from the SMR remote mobile units. The base stations communicate using standard SMR channels carrying voice band information to the SMR remote mobile units, or the base stations may simply send alert or interrogation commands to activate the SMR remote mobile units. Thus the SMR remote mobile units may be activated locally (for example by the wearer or vehicle) or remotely by the base station. The SMR remote mobile units may be used by a person as a communications radio, a radio-telephone, a cellular telephone link or as an emergency locator. The SMR remote mobile units may also be used to locate the vehicle if stolen, in an accident, for vehicle tracking or as an integral communication device.

The SMR remote mobile units communicate over licensed channels in an SMR system using a standard SMR infrastructure. SMR systems are manufactured by vendors such as Motorola and E. F. Johnson. In the preferred embodiment of the present invention, the identification and location determination components of the present invention are designed to be installed as a parallel system operating completely independent of the existing SMR system. In this fashion, the present invention may be installed and operated independent of the SMR system or it may be made an integral part of an existing SMR system.

The transmitted signals from the SMR remote mobile units are received by the base stations which are then used to locate the SMR remote mobile units. An array of irregularly-spaced dipole receiving antennas is added to the existing omni receiving antenna at each base station. For direction finding, the existing omni antenna is used as a reference antenna. This is an optional feature since, as will be described more fully below, any one of the dipole antennas of the array may be used as a reference antenna. The direction of the received signals from the SMR remote mobile units is determined by interferometric direction finding using phase difference comparisons between the various dipoles of the array. Unique algorithms using histogram analysis and spatial filtering are performed, if necessary, on the received signals at the base stations to eliminate the ambiguity caused by signal interference, signal drop out, ambiguity in beating measurements received from behind the receiving antennas and multi-path reflections.

The present invention is used in a wide variety of applications wherever a special mobile radio system infrastructure already exists. The present invention may be installed on the radio towers already used to serve the SMR system without affecting the operation of such a system. The present invention may be used to locate vehicles equipped with SMR devices, persons carrying such radios of SMR radios located in homes or buildings. The system may also be used as a "panic button" locator where an operator is in need of assistance but may not be able to communicate his identity or location.

System Overview

In the preferred embodiment of the present invention, the base stations and central site of the present invention are similar to the base stations and central site described in the aforementioned copending U.S. patent application Ser. No. 08/000,000 entitled "MULTIPATH-RESISTANT FREQUENCY-HOPPED SPREAD SPECTRUM MOBILE LOCATION SYSTEM" filed Oct. 26, 1994, which is incorporated by reference and the processing structure of this location system operates similarly to the present system. The present invention allows the accurate location of the SMR transmitters even in noisy and multi-path environments such as those found in urban environments and irregular terrain environments.

Base Station Design

The analysis and decoding of the signals received by the base stations from the SMR remote mobile units is done almost entirely in the digital domain. The carrier frequencies of the SMR frequencies are down-converted to a lower frequency in each base station and are then digitally sampled. The digital samples are processed to locate the phase information of interest for direction finding. Each base station is constructed with a plurality of digital signal processors which enable direction finding of a plurality of simultaneously transmitting SMR remote mobile units transmitting on different frequency channels.

Figure 3:
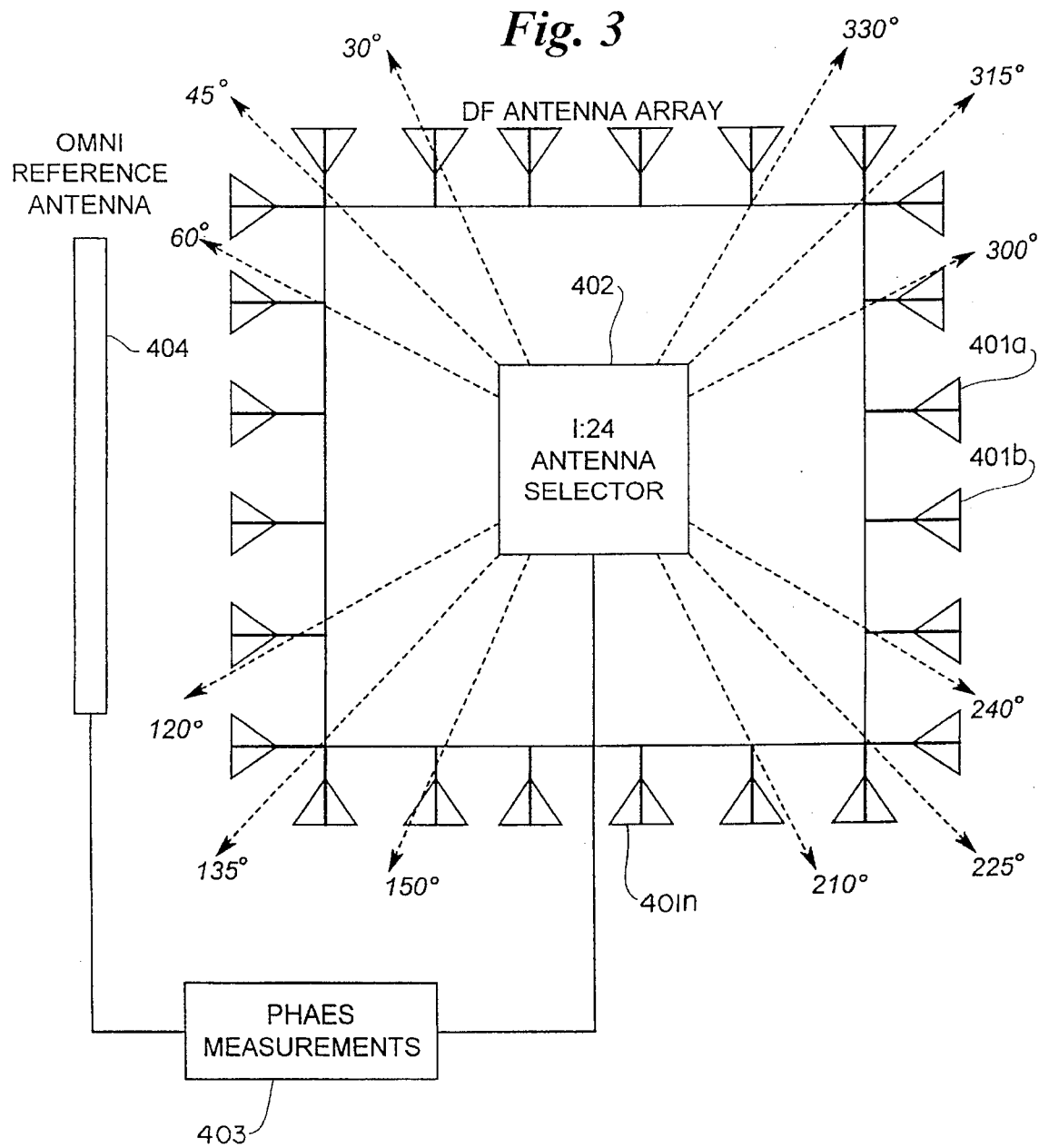
FIG. 3 is a diagram of the receiving antennas of the base stations including a plurality of dipole antennas and a single reference omni antenna.

The receiving antennas of the base stations are constructed using a plurality of dipole antennas 401a, 401b, though 401n (generally referred to as 401) arranged in an array, as shown in FIG. 3 and a single reference omni antenna 404. The omni antenna 404 is not necessary for the preferred embodiment of the present invention since any one of the dipole antennas of FIG. 3 may act as a reference antenna for any of the other antennas. The omni reference antenna 404 is used as a reference antenna became the omni antenna 404 exists as part of the SMR receiving and transmitter infrastructure upon which the present invention relies and is used for receiving the SMR voice channel messages from the SMR remote mobile units.

In the preferred embodiment of the present invention, the direction finding (DF) antennas of each base station uses twenty-four sector direction finding dipole antennas 401 arranged in four linear arrays as shown diagrammatically in FIG. 3. Each of the four linear arrays consists of six dipole antennas and an omni reference antenna. The phase between the antennas is measured indirectly—each instant of time one of the 24 antennas is selected and its phase is compared to the omni antenna.

The switching of the antennas is done every 5 milliseconds during the transmission of a particular SMR transmitter. The antennas 401 are continuously scanned since there could be several SMR remote mobile units transmitting simultaneously from different directions. Differentiating between the various simultaneously transmitting SMR remote mobile units is possible. As described above, the simultaneously received signals from different SMR transmitters will be on separate channels and the base stations are capable of distinguishing and tracking the SMR transmitters simultaneously. This is due to the use of a plurality of digital signal processors operating in parallel to analyze the incoming signals using Fast Fourier Transforms (200 Hz bins). The direction finding process, described more fully below, is implemented in digital signal processors (DSP's) located within each base station and a general purpose computer located in the central site.

SMR System Design Considerations

The present invention must be implemented to operate according to the frequencies, modulation techniques and control protocol of the specific SMR system with which the present invention will operate. For example, the present invention will track the mobile SMR transmitters which are using only specific frequency channels, specific modulation techniques and specific identification techniques. For purposes of describing the present invention, but not by way of limitation, the present invention will be described to operate on an SMR system which transmits in the 800–900 MHz band using FM modulation of analog voice information on the carrier. The identity of the transmitter is in an audio subcarrier on the modulated carrier.

As a first step, the identity of the transmitter is easily determined by either using the existing SMR system or by duplicating the identity determination function of the SMR base station in a separately operating component. The existing SMR system places the identity of the transmitter on an audio subcarrier although those skilled in the art will readily recognize that the ID information could be part of a message preamble, a sub-audible carrier or transmitted in a parallel control channel. Regardless of the technique used, the identity of the transmitter is autocratically transmitting and automatically determined at the receiver site.

As a second step, before the location algorithm can begin the processing of the phase information of the carrier to determine the incident angle of the received carrier, each base station must detect the presence of the carrier so the base station are synchronized in their operation. Each channel in the SMR system will naturally contain background noise and the direction finding algorithms should not be allowed to "free run" on noise. Instead, the carrier signal must be detected and tracked to signal the start of the direction finding algorithms in each of the base stations. The detection of the carrier in an SMR system is quite simple. In the case of FM modulation of the carrier, a simple FM detector circuit is used to detect the presence of an FM carrier. The detection of the carrier must be done in each channel where the target transmitter is transmitting in the case where the target transmitter is changing channels.

Phase Determination of the SMR Carrier

Phase comparisons of the received carrier are calculated as between a plurality of antennas in an array to determine the incident angle of the incoming carrier signal at each base station. Since the SMR carrier signal is severely modulated, phase comparisons cannot easily be made on the modulated carrier. Thus the modulation information on the carrier must be removed before accurate phase comparisons are made. By removing the modulation information, the carrier signal is treated essentially as a sine wave in the calculations described below.

Figure 4:
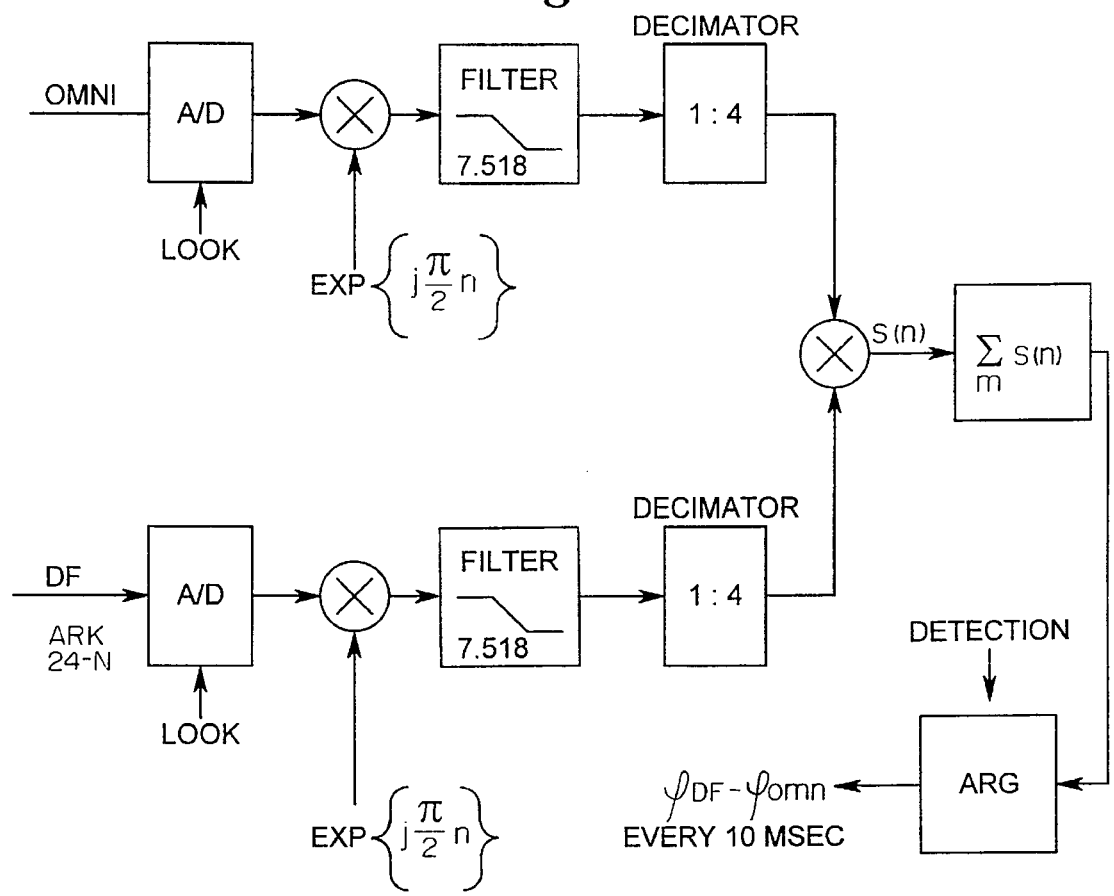
FIG. 4 is a block diagram of a carrier recovery circuit.

FIG. 4 is a block diagram of a carrier recovery circuit. The modulation information is removed and the carrier signal is recovered entirely in the digital domain. The modulated SMR carrier signal is received at the omni antenna and one of the direction finding antennas and the signals are downconverted to a lower intermediate frequency such as 75 KHz. The downconverted carriers are digitized by an A/D convertor at an approximately 100 KHz sampling rate. A digital. high-pass filter and decimation filters further limit the carriers and the conjugate of the DF carrier signal is mixed with the omni carrier signal to produce a near-sinusoidal reproduction of the unmodulated carrier.

The modulated carrier is also a relatively wide band signal which needs to be narrowed. The frequency modulated carrier may have a frequency deviation of plus or minus 5 KHz around a center frequency. The phase comparisons between the antennas may not be able to track phase changes accurately enough if the slope of the phase changes in the modulated carrier is too severe. Thus the unmodulated carrier is narrow banded by the high pass filters as shown in FIG. 4. The direction finding algorithms described below are generally immune to some phase distortion and the narrow banding of the carrier aids in the accuracy of the overall process.

The SMR carrier is also subject to selective fading, drop outs and multipath distortion especially if the transmitter is in a rapidly moving vehicle. Thus the carrier may not always be available and the direction finding algorithms may be required to operate continuously to update the location of the transmitter as it moves. The steps of detection, identification, demodulation and direction finding are performed periodically at preset intervals and can also be restarted in the face of interrupts.

The determination of the phase of the carrier must first be done before a comparison of the phase of the carrier can be made between antennas. The detection of the phase information of the carrier is performed in the preferred embodiment of the present invention by first comparing the received phase of the demodulated carrier at the omni reference antenna to the received phase of the demodulated carrier at one of the dipole antennas in the array. A matching filter or autocorrelation function is performed on the two received signals until a reasonable match of the phase of the two received carrier signals is determined. This provides the carrier information which is then used to synchronize the phase comparisons between the plurality of antennas of the direction finding array.

Antenna Design at the Base Stations

The DSP's of the base station system compare the exact phase amplitudes of each of the dipole antennas of the four arrays to the phase amplitude at the reference antenna. In the antenna array shown in FIG. 3, a circle surrounding the array is divided into eight sectors. The actual direction computation is done in the sectors according to Table 1.

TABLE 1

| Sector Allocation on the DF Antenna Array |
| --- |
| 30° to 60° - top and left arrays |
| 60° to 120° - left array |
| 120° to 150° - left and bottom array |
| 150° to 210° - bottom array |
| 210° to 240° - bottom and right array |
| 240° to 300° - right array |
| 300° to 330° - right and top array |
| 330° to 30° - top array |

Those skilled in the art will readily recognize that the whole direction finding array does not have to be installed in a single location. For instance, each linear array of six dipole antennas could be installed on a different face of roof of a high rise building. In some cases an SMR remote mobile unit cannot transmit from specific sector. For instance one of the sectors faces the sea. In that case the direction finding array could be reduced, and only a single face of the direction finding antenna array will be installed at that sector. Usually the interferometer does not operate in the case where an SMR remote mobile unit is very dose to the base station (less than 1 kilometer). In such a condition, the other base stations will still perform the direction finding and the central site will still be able to perform the triangulation.

For the reasons exemplified more fully below, the spacing of the six dipole antennas in each of the four sides of the array is critical to maintaining a low degree of ambiguity in direction finding and multi-path rejection. The base ratios of the base lines was found by simulations with several relative prime numbers and is selected to be 6:10:4:3:5 to produce a phase gain PG=56 π. The ratio was computed through extensive simulations. Although the spacing between the various antenna is critical to accurate determination of the incident angle of the carrier, the order of the spacing of the antennas in the array is not critical. The order chosen here was based primarily upon a physical implementation consideration that the array frame be mechanically balanced.

Interferometric Direction Finding

The direction finding technique used in the preferred embodiment of the present invention is performed by measuring the electrical phase difference between the antenna of the array caused by the angle of the incoming wavefront of the SMR frequency of the channel currently being used by an SMR transmitter. In ideal conditions where there is no multi-path disruptions of the wavefront, the incoming wave from the SMR remote mobile unit is coming in angle of θ from the perpendicular line to the base line on which the antennas are mounted.

Figure 5:
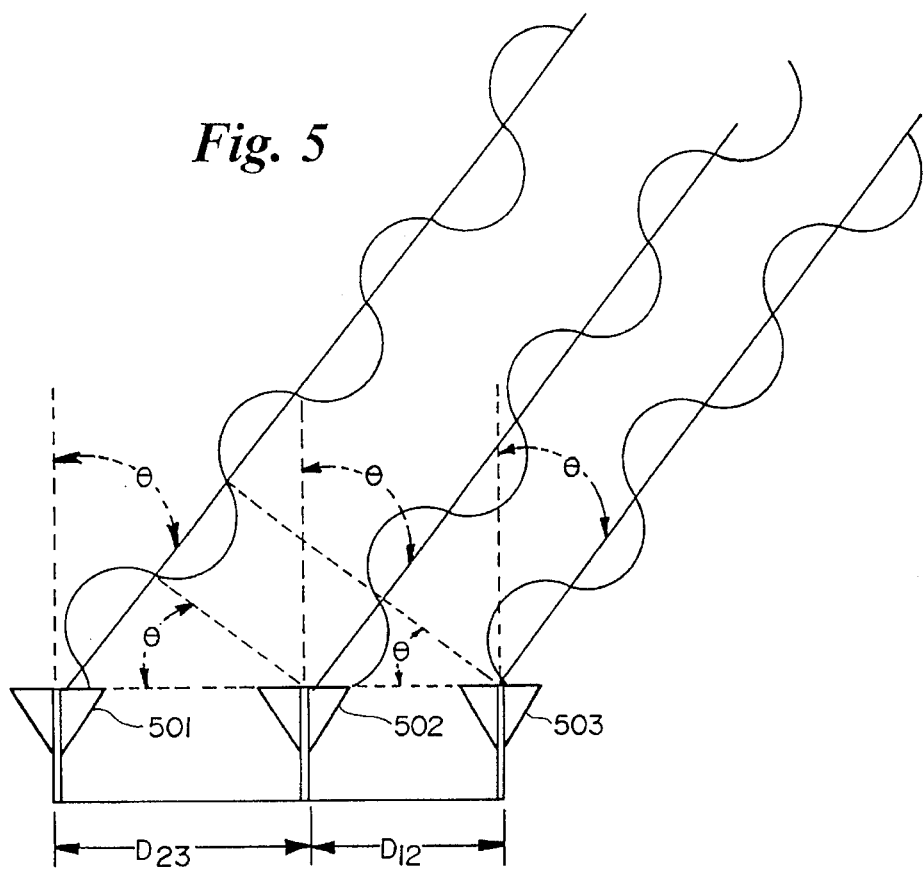
FIG. 5 is a three antenna array for an interferometric direction finding system.

FIG. 5 is an example of how the interferometric direction finding technique of the preferred embodiment of the present invention is practiced. FIG. 5 shows, by way of example and not by limitation, only three antennas of the array. The three antennas are used to determine phase differences of the incoming signals between pairs of the antenna. As described above, the phase difference may also be measured between each antenna and a reference antenna such as the omni antenna.

The interferometer direction finding (DF) technique calculates the direction of arrival of the wavefront by measuring the phase of the incoming wave front in several places in space. This interferometric method is a planar interferometric method which assumes that the antenna array and the transmitting SMR remote mobile unit are all in the same relative plane. Differences in height of the SMR remote mobile unit and the antenna array are ignore and came little error in the direction finding of the present invention.

As seen from FIG. 5, the three antenna 501, 502 and 503 are irregularly spaced such that distance $D_{23}$ between antennas 501 and 502 is great than distance $D_{12}$ between antennas 502 and 503. The distance between the antennas is selected to be a multiple of a phase number sequence to ensure an irregular spacing of all antennas in the array which increases the probability that an electrical phase difference will always be measured between some of the antenna members of the array. The distance between the antennas is important to minimize ambiguity errors in measuring the phase of the incoming wavefront. If the antennas are spaced too widely apart, there is increased ambiguity in determining whether the phase difference of the same portion of the voice-modulated signal is being compared or whether the phase of different portion of the voice-modulated signals are being mistakenly compared. Since the licensed frequencies of the SMR channels operate in the 800 MHz band, the wavelength λ of the incoming signal is approximately 38 centimeters.

Again, referring to FIG. 5, the phase difference between the two antennas 502 and 503 is know as $D_{12}$ and the formula for measuring the angle of the incoming signal is:

$$(\Phi_{12}+2 \pi K_{12})/2 \pi = D_{12} \sin(\theta)/\lambda \tag{1}$$

where

θ is the angle of the incoming wavefront measured from the perpendicular of the antenna array baseline, $\Phi_{12}$ is the electrical phase measured between antennas 502 and 503

$k_{12}$ is an ambiguity factor since the system is capable of measuring φ between ±π since the antennas could be measuring the phase difference of more than one carrier cycle λ, $D_{12}$ is the distance between the antennas 502 and 503, and λ is the wavelength of the incoming signal.

According to this formula, as long as $D_{12}$ is smaller than λ/2, the ambiguity factor $K_{12}$ equals 0. Thus the largest antenna spacing in the array is selected to be smaller that 15 centimeters.

In order to estimate the inherent instrumental error of the direction finding interferometer, the above equation can be written in a different from:

$$\sin(\theta) = (\Phi_{12} = 2 \pi K_{12})/(2 \pi D_{12}/\lambda) \tag{2}$$

Assuming that all the errors in estimating θ is due to inaccuracies in estimating Φ, differentiating the above equation produces:

$$\sigma(\theta) = \sigma(\Phi_{12})/(2 \pi D_{12} \cos(\theta)/\lambda) \tag{3}$$

where σ is the standard deviation. From this equation, inherent limitations in the system are determined. The electrical error is divided by the factor $2 \pi D_{12}/\lambda$ which is termed the phase gain (PG) which reduces the error by the ratio between the distance and the wave length. Also, the error rapidly grows to infinity as θ approaches 90°. Thus the coverage of the present linear interferometer is limited to ±60° as shown by the division of the array into sectors described in above in conjunction with Table 1. In order to reduce the error, the phase gain must be made as large as possible and each antenna face of the antenna array of the present linear interferometer array covers only ¼ of the space. The antenna spacing in the array must have a distance smaller than λ2 in order to resolve ambiguities.

Ambiguities in Interferometer Direction Finding

There are two types of ambiguities in interferometer DF: front to back ambiguities (the linear interferometer only covers effectively ⅓ of its surrounding area) and multiple possible solutions of the interferometer equations, in case where the distance between two antennas is greater than λ/2. This latter ambiguity is caused by measuring the phase difference between different portions of the voice-modulated signal of the incoming wavefront.

The front to back ambiguity is solved in the present invention by using multiple arrays, as shown in FIG. 3. In order to cover 360°, the present invention uses four sub-arrays of six dipole antennas each, for covering 90°. The antennas in each array have a vertical beam width of 120°. The base station scans all the antennas of the array through the 1:24 antenna selector 402 and selects the proper sub-array by comparing the amplitudes received from antennas in each array. If two arrays are almost equal in amplitude (within 3 dB), then the interferometer process is done on both arrays and the direction of arrival (DOA) of the signal is computed either from both or from the proper array which is selected according to the direction of arrival closer to its perpendicular. See FIG. 8.

The phase ambiguity is solved by using more than two antennas in each linear array to compare the incoming voice-modulated carrier signals. By way of example, but not by limitation, a three antenna array is as shown in FIG. 5. The distances between the antennas that are elected as $D_{12}=2*\lambda/2$ and $D_{23}=3*\lambda/2$. Using these ratios, the equation labeled (2) above becomes:

$$\text{SIN }(\theta)=\Phi_{12}/2\ \pi+K_{12} \quad (4)$$

$$\text{SIN }(\theta)=\Phi_{23}/3\ \pi+2K_{23}/3 \quad (5)$$

Figure 6:
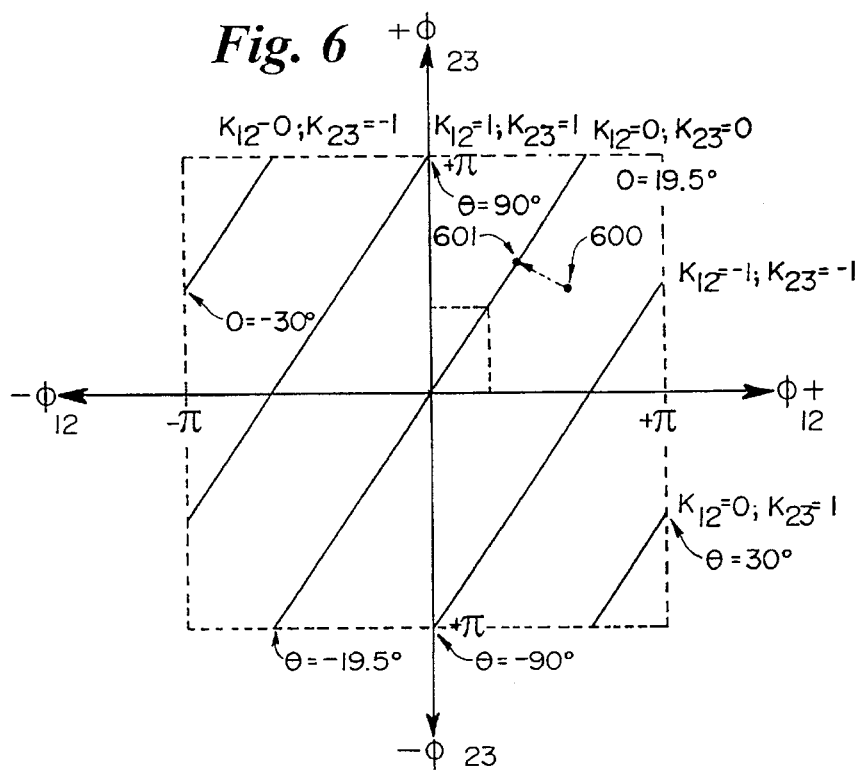
FIG. 6 is an ambiguity plane plot of the three antenna array of FIG. 5.

FIG. 6 is an ambiguity plane plot of the three antenna array of FIG. 5. FIG. 6 shows the phase difference $\Phi_{12}$ plotted against the phase difference $\Phi_{23}$ as an interferometer ambiguity plane plot. FIG. 6 shows a family of lines, 601, 602, 603, 604, and 605, parameterized by $K_{12}$ & $K_{23}$ with the same slope created as $\theta$ moves from 0° to ±90°. As derived from equations 4 and 5 above, the following formula is used to create the plane plot of FIG. 6:

$$(\Phi_{23}/3\ \pi)+2K_{23}/3=(\Phi_{12}/2\ \pi)+K_{12}$$

The ambiguity resolution algorithm is as follows. The phase difference between the antennas is measured as $\Phi_{12}$ and $\Phi_{23}$. On the interferometer ambiguity plane of FIG. 6, find the line represented by $K_{12}$ and $K_{23}$ (ambiguity factors) that has the minimal distance, which is the actual probability distance, to $\Phi_{12}$ and $\Phi_{23}$. After solving the ambiguity, the present invention computes the exact direction of arrival using the full span of the array i.e. $2.5\lambda$ which gives a phase gain (PG) of $5\ \pi$.

One could select ratios of N:N+1 of $\lambda/2$, where N is the number of antennas in the array. This ratio of N:N+1 of $\lambda/2$ may be selected to be as large as possible in order to improve the phase gain. But as N gets larger, the distance between the ambiguity lines gets smaller and the algorithm becomes vulnerable to an error in the proper selection of $K_{12}$ and $K_{23}$. The result twill be a gross error.

If the measurements distribution of $\Phi$ is gaussian, then in order to compute the gross error probability, the "tail" of the gaussian distribution from the distance between the ambiguity lines to "infinity" must be computed since the phase is folding after ±π. This computation described above is only an approximation and is almost true for small values of $\sigma$ ($\Phi$) which is true at high signal to noise ratio (SNR) or high signal to interference ratio. For white gaussian noise, $\sigma$ ($\Phi$) could be approximated by $1/\sqrt{SNR}$ where SNR is the signal to noise ratio.

Figure 7:
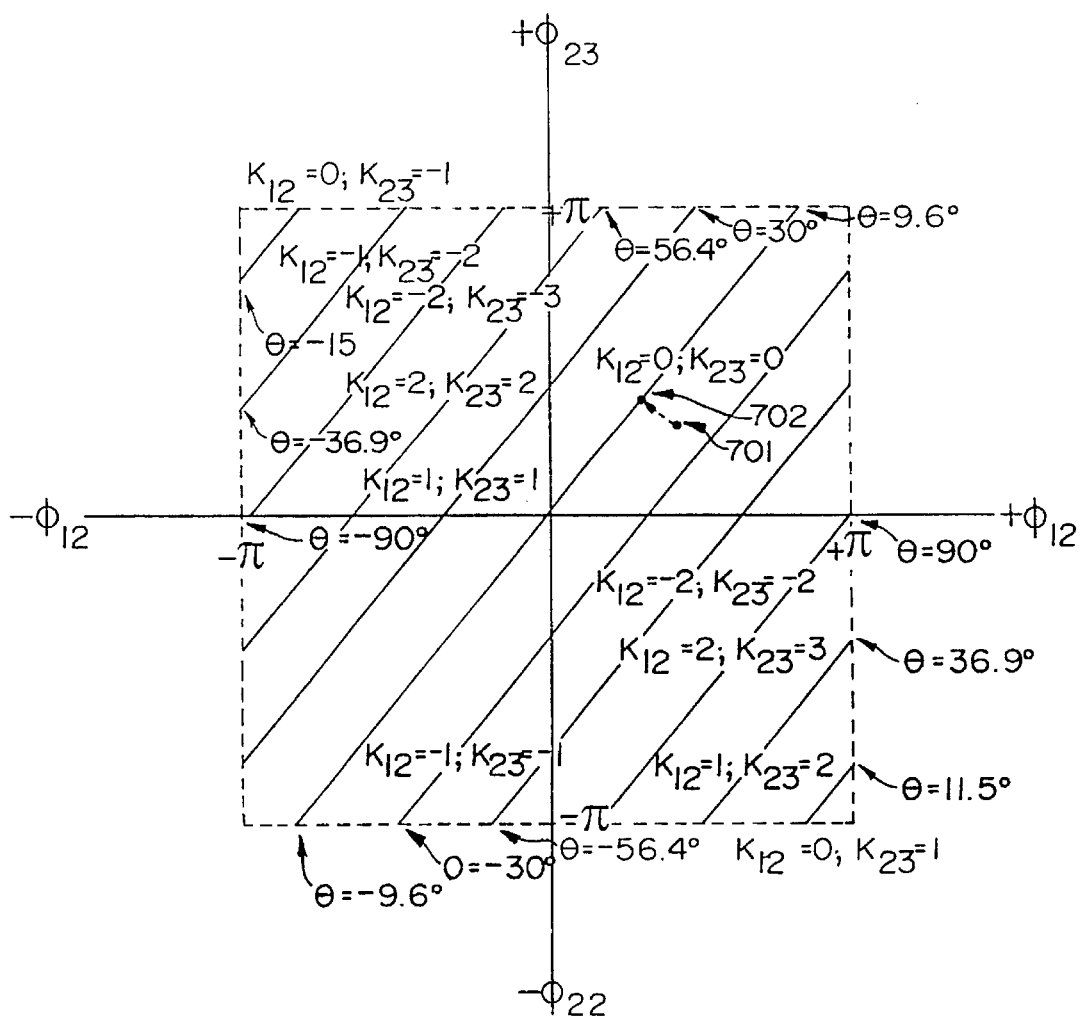
FIG. 7 is the ambiguity plane for the ratios 5:6 of $\lambda/2$ the three antenna array of FIG. 5.

FIG. 7 is the ambiguity plane for the ratios 5:6 of $\lambda/2$. The distance between the ambiguity lines became less than half compared to the ratio of 2:3 which practically increased the gross error to be impractical. Thus, the solution is to add more antennas to the array. Adding more antennas at different ratios spreads out the ambiguity lines in hyper space (multi-dimensional space) with dimension of N−1 (N−number of antennas in the array) and increases the distance between them. In the preferred embodiment of the present invention, it was concluded that in an urban environment six antennas are required in a linear array resulting in a five dimensional plot of FIG. 6 (which is incapable of being shown in a drawing). The following formula are used to create the plane plot of FIG. 7 which is an example of moving the antenna spacing closer together:

$$\text{SIN }(\theta)=(\lambda/D_{12})*(\Phi_{12}+2\ \pi K_{12})/(2\ \pi)=(\Phi_{12}/5\ \pi)+2K_2/5$$

$$\text{SIN }(\theta)=(\lambda/D_{23})*(\Phi_{33}+2\ \pi K_{23})/(2\pi)=(\Phi_{23}/6\ \pi)+K_{23}/3\ (\Phi_{23}/6\ \pi)+K_{23}/3=(\Phi_{12}/5\ \pi)+2K_{12}/5$$

Direction Finding Algorithm

The full direction finding algorithm relates to measurements of a linear antenna array having six dipole antennas per side of a four-sided array with a single omni reference antenna (see FIG. 3). The calculations are performed on a six antenna subarray after the sub-array is selected to be closest to the SMR remote mobile unit as described above in conjunction with Table 1. The full interferometer formula for a six antennas sub-array is:

$$\begin{vmatrix} \phi_1 \\ \phi_2 \\ \phi_3 \\ \phi_4 \\ \phi_5 \end{vmatrix} = \frac{2\pi}{\lambda} \begin{vmatrix} D_1 \\ D_2 \\ D_3 \\ D_4 \\ D_5 \end{vmatrix} \text{SIN}(\theta) + 2\pi \begin{vmatrix} K_1 \\ K_2 \\ K_3 \\ K_4 \\ K_5 \end{vmatrix} + \begin{vmatrix} \epsilon_1 \\ \epsilon_2 \\ \epsilon_3 \\ \epsilon_4 \\ \epsilon_5 \end{vmatrix} \quad (6)$$

where $\Phi_i$ is the electrical phase measured between the antennas, $D_i$ is the distances between the antennas $\lambda$ is the wavelength $\theta$ is the direction of arrival (DOA)

$K_i$ is the ambiguity factor, integer value such that, $$-\pi < 2\ \pi D_i * \text{SIN }(\theta)/\lambda + 2\ \pi K_i < \pi$$

$\epsilon_i$ is the additive noise (assumed to be gaussian).

To solve the equation is (6) above, linear array calculations are performed to solve the following values:

$$\underline{\phi} = \begin{vmatrix} \phi_1/2\pi \\ \phi_2/2\pi \\ \phi_3/2\pi \\ \phi_4/2\pi \\ \phi_5/2\pi \end{vmatrix} ; \underline{d} = \begin{vmatrix} 2D_1/\lambda \\ 2D_2/\lambda \\ 2D_3/\lambda \\ 2D_4/\lambda \\ 2D_5/\lambda \end{vmatrix} ; \underline{K} = \begin{vmatrix} K_1 \\ K_2 \\ K_3 \\ K_4 \\ K_5 \end{vmatrix} ; \underline{E} = \begin{vmatrix} \epsilon_1/2\pi \\ \epsilon_2/2\pi \\ \epsilon_3/2\pi \\ \epsilon_4/2\pi \\ \epsilon_5/2\pi \end{vmatrix} \quad (7)$$

$$X \equiv 0.5\ \text{SIN}(\theta)$$

$$\underline{\phi} = \underline{d}\ X + \underline{k} + \underline{E} \Rightarrow \underline{\phi} - \underline{k} = \underline{d}\ X + \underline{E}$$

The results of these calculations are as follows:

the vector elements $\underline{\Phi}$ are limited by: $|-0.5 < \Phi_i < 0.5|$;

$\underline{\Phi}$ is the measurements vector and $\underline{d}$ is known;

$-0.5 < X < 0.5$; X is unknown;

$\underline{k}$ is unknown; its elements are integer, limited by the elements of $\underline{d}$ $\underline{E}$ is the noise vector that is unknown.

In the calculations, it is assumed that the noise is additive such as:

$$E\{\phi_i \cdot \phi_j\} = \begin{cases} 0 & i \neq j \\ \sigma^2 & i = j \end{cases} \quad (8)$$

$$E\{\epsilon_i\} = 0;\ i \in (1,2,3,4,5)$$

$$E\{\epsilon_i * \epsilon_j\} = \begin{cases} 2\sigma^2 & i = j \\ -\sigma^2 & i = j - 1 \\ -\sigma^2 & i = j + 1 \\ 0 & \text{otherwise} \end{cases}$$

$$R = COV(\underline{\phi}) = \left(\frac{\sigma}{2\pi}\right)^2 \begin{bmatrix} 2 & -1 & 0 & 0 & 0 \\ -1 & 2 & -1 & 0 & 0 \\ 0 & -1 & 2 & -1 & 0 \\ 0 & 0 & -1 & 2 & -1 \\ 0 & 0 & 0 & -1 & 2 \end{bmatrix}$$

Where $\Phi_i$ is the electrical phase measured at antenna i.

$\Phi_i = \phi_i - \phi_{i+1}$

The solution to this equation is to search among all $\underline{K} \in N$, the specific $\underline{K}$ that minimizes a weighting function in a weighted least square procedure (WLS). For every $\underline{K} \in N$ we compute:

$$\hat{X}(\underline{K}) = \frac{d^T R^{-1}}{\underline{d}^T R^{-1} \underline{d}^{-1}} (\underline{\phi} - \underline{K}) = H(\underline{\phi} - \underline{K}) \quad (9)$$

The error will be:

$$\underline{\epsilon}(\underline{K}) = \underline{\phi} - \underline{d}\hat{X}(\underline{K}) = \left( I - \frac{\underline{d}\underline{d}^T R^{-1}}{\underline{d}^T R^{-1} \underline{d}^{-1}} \right) (\underline{\phi} - \underline{K}) \quad (10)$$

Weighting function:

$$C(\underline{K}) = \underline{\epsilon}^T(\underline{K}) R^{-1} \underline{\epsilon}(\underline{K}) = \quad (11)$$

$$(\underline{\phi} - \underline{K})^T \left( I - \frac{\underline{d}\underline{d}^T R^{-1}}{\underline{d}^T R^{-1} \underline{d}^{-1}} \right)^T R^{-1} \left( I - \frac{\underline{d}\underline{d}^T R^{-1}}{\underline{d}^T R^{-1} \underline{d}^{-1}} \right) (\underline{\phi} - \underline{K}) = (\underline{\phi} - \underline{K})^T A (\underline{\phi} - \underline{K})$$

$$A = \left( I - \frac{\underline{d}\underline{d}^T R^{-1}}{\underline{d}^T R^{-1} \underline{d}^{-1}} \right)^T R^{-1} \left( I - \frac{\underline{d}\underline{d}^T R^{-1}}{\underline{d}^T R^{-1} \underline{d}^{-1}} \right)$$

Where A is 5×5 matrix. The rank of A is only 4. In order to reduce the amount of real time computation, the following computations are performed and the results stored:

$$A = F^T F \quad (12)$$

$$A = A_V A_Q A_V^T$$

$$[A_V A_Q] = \text{eig}(A)$$

$$F = A_Q^{1/2} A_V^T$$

Since the rank of A is 4, one of the eigenvalues and thus the corresponding eigenvector are 0. Matrices 4×5 and 5×4 are created and designated by a ~ over the top of the matrix identifier and thus:

$$A = \tilde{F}^T \tilde{F}$$

$$\tilde{F} = \tilde{A}_Q^{1/2} \tilde{A}_V^T \quad (13)$$

Using these values in the weighting function produces:

$$C(\underline{K}) = (\underline{\phi} - \underline{K})^T \tilde{F}^T \tilde{F} (\underline{\phi} - \underline{K}) \quad (14)$$

$$\tilde{\underline{\phi}} = \tilde{F} \underline{\phi}$$

$$\tilde{\underline{K}} = \tilde{F} \underline{K}$$

$$C(\underline{K}) = (\tilde{\underline{\phi}} - \tilde{\underline{K}})^T (\tilde{\underline{\phi}} - \tilde{\underline{K}}) = |\tilde{\underline{\phi}} - \tilde{\underline{K}}|^2$$

The full algorithm thus becomes: Compute in off-line:

1. Compute $\tilde{F}$.
2. For all $\underline{K} \in N$ compute $\tilde{\underline{n}} = \tilde{F} \underline{K}$.
3. Compute the matrix $\underline{H}$.

Compute in real time:
 1. Compute:

$$\tilde{\Phi} = \tilde{F} \Phi$$

2. For all $\underline{n} \in N$, compute:

$$C(\underline{K}) = |\tilde{\underline{\Phi}} - \tilde{\underline{K}}|^2$$

3. Find the best three (3) $\tilde{\underline{K}}$ that mostly minimize $C(\underline{K})$. This procedure is done for each hop.
4. Compute $X(\underline{K})$ for those $\underline{K}$ selected.
5. Compute a histogram from all the $X(\underline{K})$, using for each DOA its distance from the lines (weight) in inverse as weight.
6. Filter the histogram by passing a boxcar low-pass filter of 3° over the histogram in order to cancel small peaks in the neighborhood of a real peak.
7. Find the highest peak and the second to the highest peak.
8. Report the results.

Triangulation Process

The input to the location algorithm are reported measured directions from several base stations. Each base station reports two directions. Each direction is reported with its peak heights which is an indication of its validity. The location algorithm projects the direction of the incoming signal on a gnomonic plane tangent to earth, it filters out the false readings, and it computes the most probable location of the SMR transmitter.

Cassini UTM Projection

Figure 9:
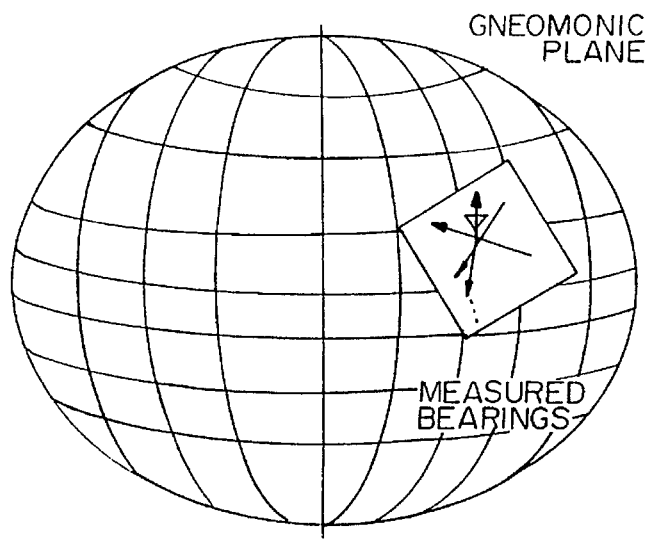
FIG. 9 is a diagram of a gnomonic plot of the measured bearings of the direction finding algorithm on a sphere.

The solution of triangulation on the earth ellipsoid is a highly non-linear problem. In order to simplify the problem, we transfer the observed data to a plane called the gnomonic plane as shown in FIG. 9. The geographic location of the base station on earth is transferred to an X–Y position on the gnomonic plane. Each measured bearing is also transferred to the gnomonic plane with a small adjustment. The estimation process is done on the plane. The estimated location of the SMR remote mobile unit is not transferred back to an earth ellipsoid since the stone plane is used for graphic display of maps using a Microsoft Windows program or the like.

The Cassini UTM projection is widely used for mapping. Its advantages are that the mapping are in the Cartesian coordinate system such that the E–W and N–S lines are orthogonal. The projection maintains approximately both the directions related to the north and the distances at radius less than 50M. The projection is very convenient for graphic display such as in the Microsoft Windows format.

The main distortion of the UTM projection is caused by the convergence of the meridian toward the north. There are two corrections that have to be made:

1. Correction of the map north to the geographical north, which is a bias correction; and
2. Small correction of the DOA (direction of arrival) of the signal according to the location of the base station.

In actual observations, the correction was actually measured together with the calibration and measurement of the pointing of the direction finding array toward the north. The calibration was performed relative to known reference point locations in the covered area. To improve system accuracy, a reference transmitter having a known exact location may be used to correct the system parameters.

Direction Finding Fixing on a Plane

The fixing process input are the two DOA's received frown all the base stations. Those skilled in the art will readily recognize that the present invention can operate with more or less DOA's from the base stations. There are several tests performed on the results received from the base stations (BS):

If the peaks are too low, both measurements are ignored.
If the ratio between peaks is larger than 4, the second peak is ignored. The CS (Central System) computes the fix by using all the combinations from the DOA received from the base stations. Note that within one message there could be several DOAs.

The fixing process is an LMS (least mean square) process in which the most probable point is found. The most probable point is defined as the point on the plane that its sum of the squared distances from all the DOAs is minimal. The process is as follows:

The distance of a point (X,Y) from a DOA is:

$$d_i(X, Y)=(Y-Y_i) \cos (\theta_i)-(X-X_i) \sin (\theta_i) \quad (15)$$

where $(X_i, Y_i)$ are the coordinates of the base station number i.
$d_i(X, Y)$—distance of (X, Y) from the DOA number i.
$\theta_i$—The angle of DOA number i from the north
(X, Y)—a point on the plane
(15) could be written as:

$$X_i \sin (\theta_i)-Y_i \cos (\theta_i)=X \sin (\theta_i)-Y \cos (\theta_i)+d_i \quad (16)$$

Figure 8:
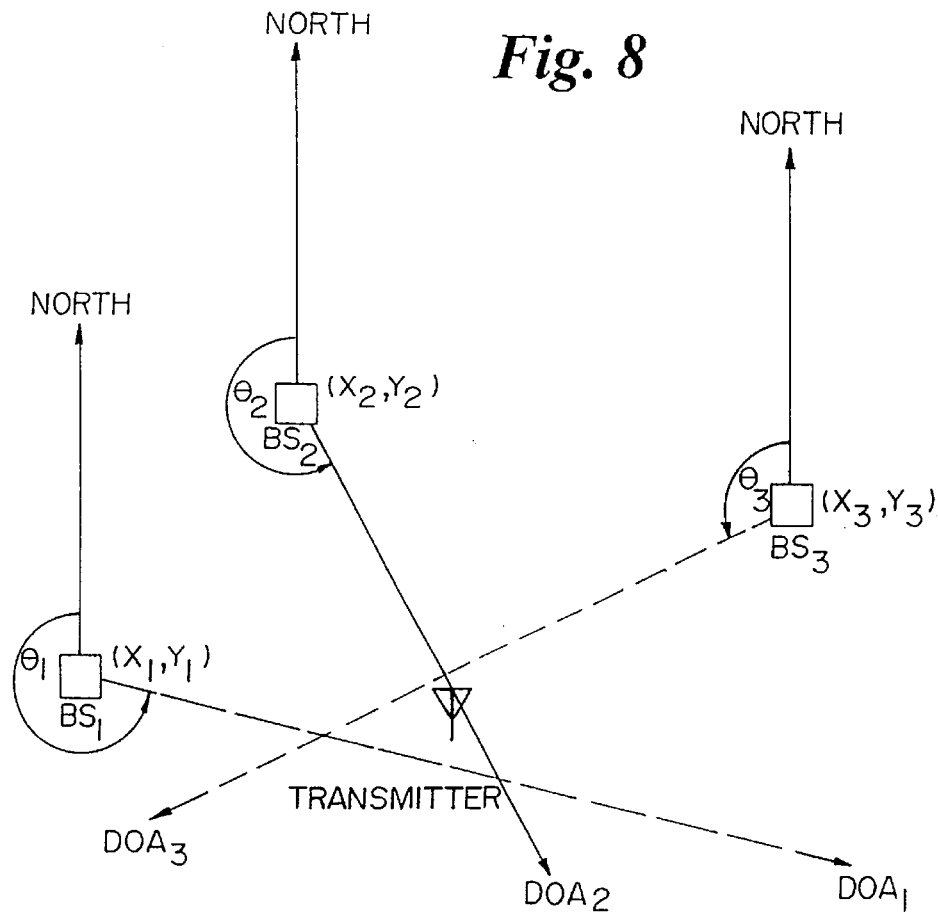
FIG. 8 is diagram showing triangulation of the location of a SMR transmitter between three base stations.

Assuming that M inputs from the base station, $(i \in \{1, \ldots, M\})$, equation (16) is written in a matrix form:

$$\begin{bmatrix} X_i \sin(\theta_i) - Y_i \cos(\theta_i) \\ \vdots \\ X_M \sin(\theta_M) - Y_M \cos(\theta_M) \end{bmatrix} = \begin{bmatrix} \sin(\theta_i) - \cos(\theta_i) \\ \vdots \\ \sin(\theta_M) - \cos(\theta_M) \end{bmatrix} \begin{bmatrix} X \\ Y \end{bmatrix} + \begin{bmatrix} d_i \\ \vdots \\ d_M \end{bmatrix} \quad (17)$$

where M—number of bases. As shown in FIG. 8, M=3.

$$\underline{Z} \equiv \begin{bmatrix} X_i \sin(\theta_i) - Y_i \cos(\theta_i) \\ \vdots \\ X_M \sin(\theta_M) - Y_M \cos(\theta_M) \end{bmatrix} \quad (18)$$

$$A = \begin{bmatrix} \sin(\theta_i) - \cos(\theta_i) \\ \vdots \\ \sin(\theta_M) - \cos(\theta_M) \end{bmatrix}$$

$$\underline{c} \equiv \begin{bmatrix} X \\ Y \end{bmatrix}$$

$$\underline{D} \equiv \begin{bmatrix} d_i \\ \vdots \\ d_M \end{bmatrix}$$

$$\underline{Z} = A\underline{c} + \underline{D}$$

Where:

$\underline{z}$ is a vector of M elements.
A is a matrix of M rows, 2 columns.
$\underline{c}$ is a vector of M elements.
$\underline{D}$ is a vector of M elements.

The purpose is to find $\underline{z}$ such that $\underline{D}^T\underline{D}$ will be minimized. The algorithm is LMS, as described above, and is performed by differentiating $\underline{D}^T\underline{D}$ relative to $\underline{c}$ and comparing the result to 0.

Complete Fixing Algorithm

1. Compute all intersections between all probable DOA's using (19).

2. Perform two dimensional filtering over all intersections, taking into account the power of each intersection according to the DOA's power that created that intersection. The filter size is 900×900 meters.

3. Find the an intersection from the DOA that are in the filter.

Operation Summary

In summary, and in referring once again to FIG. 6, the slope of the ambiguity lines is ⅔ and the algorithm finds the closest line to the observed point 600. The most probable actual point lies on the line 601. FIG. 7 shows the use of more ambiguity lines to get better resolution of the observed point 701. The actual probable location of the observed point would be on the line at position. 702 where the slope of each of the ambiguity lines is the distance between the antennas. Thus a closer spacing of the antennas shown at FIG. 7 produces less ambiguity as to the observed versus actual angle of the direction of arrival (DOA).

The ambiguity lines shown in FIGS. 5 and 6 are for three antennas. In reality according to the matrices described above, six antennas are used in a five dimensional space which is unable to be drawn in a figure. In a five dimensional space, the observed point is located, and the nearest lines in the five dimensional space are located for the most probable actual DOA for each based station. By spreading out the spacing of the antennas, more ambiguity lines as shown in FIG. 7 are used such that antenna spacing is best spread out to minimize ambiguity.

In the based station, the observed point 701 representing DOA θ is compared to the closest three lines in a five dimensional space. A histogram is then generated based on the three lines closest to the observed point. Then a gaussian distribution of the observed θ's is computed and only the actual points 702 and five dimensional space are picked which lie within a single standard deviation. A histogram typically produces two peaks for most probable observed values. Histograms that produce more than two peaks are filtered so that only the two strongest peaks are taken as potential values. These two most probable actual values of the DOA θ are then sent to the central site for triangulation to determine the position of the transmitter.

At the central site, the two most probable θ for the two histogram peaks around a plus or minus three degree range are recorded for two, three or more base stations. Thus $2^n$ most probable points are received by the base station whereas n is equal to the number of stations. Thus if four stations are reporting, two most probable DOA θ, 16 observed points are received at the central station. A spacial filter is used with a 900 by 900 meter space to determine which of the points cluster within the most probable location. Within this 900 square meter space, the most probable location is selected. Additional computation can be made by overlaying the 900 by 900 square meter space onto a map of an urban area and, for vehicle location, determining that the vehicle could only be on a street and not within a building. In actual observations, the actual location of the SMR remote mobile unit is within a 77 square meter area.

Thus the multipath problem is solved through the use of a multidimensional ambiguity space to eliminate observed DOA values which are least probable. The use of a plurality of arrays will produce a number of observed values within the n-dimensional ambiguity space, some of which are due to the actual direction of arrival and some of which are due to multipath reflections. Since the observed values in the preferred embodiment of the present invention are the result of multiple frequencies in multi-channel SMR system, observed values and most probable values will be calculated at various frequencies if the SMR transmitter uses several channels. Different frequencies observed over a period of time may be more or less susceptible to the multipath problem. In addition, for a moving SMR remote mobile unit, the doppler shift will be observed but minimized over time since only the most probable values due to the strongest signals will survive a histogram analysis. Thus the histogram analysis should be preformed over a number of frequency hops over a longer period of time until the multipath signals statistically drop out. Thus only the true direction signals will survive the histogram analysis and will be passed to the central station for final analysis.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A mobile radio location system, comprising:
   a mobile radio having a unique identifier, and having a transmitter for sending a message on one or more selected frequency channels selected from a set of available frequency channels and for coordinating selection of the one or more selected frequency channels on a control channel;
   a first base station having a first array of irregularly spaced antennas operable for receiving the message on the one or more selected frequency channels, operable for receiving control information on the control channel and capable of determining a first direction of origin of the message by phase differences measurements on the array of irregularly spaced antennas using interferometric direction finding;
   a second base station having a second array of irregularly spaced antennas operable for receiving the message on the one or more selected frequency channels, operable for receiving control information on the control channel and capable of determining a second direction of origin of the message by phase differences measurements on the second array of irregularly spaced antennas using interferometric direction finding; and
   a central station connected to the first base station and the second base station, and operable for:
   1.) receiving the first direction of origin of the message from the first base station;
   2.) receiving the second direction of origin of the message from the second base station;
   3.) triangulating the first direction with the second direction to determine the location.

2. The special mobile radio location system according to claim 1 wherein a reference station operates periodically to transmit a reference signal of known origin and location to calibrate the first and second base stations and the central station.

3. The special mobile radio location system according to claim 1 wherein the first base station and the second base station both include a reference antenna such that the phase difference of the one or more selected channel frequencies between each antenna of the array of irregularly spaced antennas and the reference antenna is determined.

4. A special mobile radio location system, comprising:
   a special mobile radio having a unique identifier, and having a transmitter for sending a message on one or more selected frequency channels selected from a set of available frequency channels and for coordinating selection of the one or more selected frequency channels on a control channel;
   a first base station having an array of irregularly spaced antennas operable for receiving the message on the one or more selected frequency channels, operable for receiving control information on the control channel and capable of determining a first direction of origin of the message;
   a second base station also having an array of irregularly spaced antennas operable for receiving the message on the one or more selected frequency channels, operable for receiving control information on the control channel and capable of determining a second direction of origin of the message;
   a central station connected to the first base station and the second base station, and operable for:
   1.) receiving the first direction of origin of the message from the first base station;
   2.) receiving the second direction of origin of the message from the second base station;
   3.) triangulating the first direction with the second direction to determine the location; and
   wherein the first base station and the second base station both operate to reduce the ambiguity of the direction of arrival of the incoming signal by calculating a multi-dimensional ambiguity space having lines indicating the only possible angles of the direction of arrival of the signal and determining the probable points of these lines which are closest to the observed value.

5. The mobile location system according to claim 4 wherein the first base station and the second base station both generate a histogram of the probable values and sending the two most probable values to the central station.

6. The mobile location system according to claim 1 wherein the central site received the most probable values from the first and second base stations and applies a spatial filter to only use the most probable values which lie within a preselected distance of the average location of all most probable values.

7. A method of locating a trunked mobile transmitter, comprising the steps of:
   a.) receiving at a first base station a trunked radio frequency signal on a plurality of irregularly spaced antennas;
   b.) removing the modulation information to produce a demodulated radio frequency carrier signal;
   c.) calculating the observed angle of arrival of the demodulated radio frequency carrier signal by comparing the phase difference of the demodulated radio frequency carrier signal between pairs of the plurality of irregularly spaced antennas;
   d.) determining the most probable angle of arrival of the demodulated radio frequency carrier signal by comparing the observed angle of arrival to ambiguity lines in an n-dimensional space where the number of antennas is n+1;
   e.) repeating steps a.–d. for each of a plurality of base stations to produce a plurality of most probable angles of arrivals;
   f.) calculating an histogram of the plurality of most probable angles of arrivals and selecting the strongest most probable values; and
   g.) applying a spatial filter to the strongest most probable values from each base station and selecting the location based on the closest grouping of the strongest most probable values.

* * * * *